United States Patent
Barton et al.

(10) Patent No.: US 9,159,086 B1
(45) Date of Patent: Oct. 13, 2015

(54) SYSTEM AND METHOD TO INSTALL MOBILE APPLICATIONS FROM A DESKTOP

(71) Applicant: Adknowledge, Inc., Kansas City, MO (US)

(72) Inventors: Chris Barton, Estero, FL (US); Rudis Muiznieks, Fort Myers, FL (US)

(73) Assignee: Adknowledge, Inc., Kansas City, MO (US)

( * ) Notice: Subject to any disclaimer, the term of this patent is extended or adjusted under 35 U.S.C. 154(b) by 0 days.

(21) Appl. No.: 14/260,762

(22) Filed: Apr. 24, 2014

Related U.S. Application Data

(60) Provisional application No. 61/816,538, filed on Apr. 26, 2013.

(51) Int. Cl.
*G06F 9/445* (2006.01)
*G06Q 30/02* (2012.01)

(52) U.S. Cl.
CPC .............. *G06Q 30/0267* (2013.01); *G06F 8/61* (2013.01)

(58) Field of Classification Search
CPC .............................. G06F 8/61; G06Q 30/0267
USPC .................................................. 717/174–178
See application file for complete search history.

(56) References Cited

U.S. PATENT DOCUMENTS

| | | | | |
|---|---|---|---|---|
| 6,496,979 | B1* | 12/2002 | Chen et al. | 717/178 |
| 8,250,571 | B2* | 8/2012 | Tseng | 717/177 |
| 8,261,261 | B2* | 9/2012 | Tseng | 717/177 |
| 8,855,620 | B2* | 10/2014 | Sievers et al. | 455/419 |
| 2008/0003991 | A1* | 1/2008 | Sievers et al. | 455/418 |
| 2008/0040490 | A1* | 2/2008 | Karlberg | 709/228 |
| 2008/0242284 | A1* | 10/2008 | Vechey et al. | 455/415 |
| 2010/0161434 | A1* | 6/2010 | Herwig et al. | 705/20 |
| 2011/0055247 | A1* | 3/2011 | Blumberg et al. | 707/769 |
| 2012/0054735 | A1* | 3/2012 | Tseng | 717/171 |
| 2012/0054738 | A1* | 3/2012 | Tseng | 717/177 |
| 2012/0135705 | A1* | 5/2012 | Thaker | 455/405 |
| 2012/0221628 | A1* | 8/2012 | Fujigaki | 709/203 |
| 2013/0110676 | A1* | 5/2013 | Kobres | 705/26.41 |
| 2013/0166655 | A1* | 6/2013 | Martin | 709/206 |
| 2013/0254024 | A1* | 9/2013 | Woods et al. | 705/14.51 |

* cited by examiner

*Primary Examiner* — Qing Chen
(74) *Attorney, Agent, or Firm* — Meunier Carlin & Curfman LLC

(57) ABSTRACT

Systems and methods for Desktop-To-Mobile (D2M) application installation that allows a publisher to extend their relationship with a consumer from the Desktop PC (PC) to a mobile device. In accordance with some implementations, a mobile application store may be used to offer apps on a user's mobile device as a result of a user acceptance of an offer(s) for the apps. The user may install a personal computer (PC)-based application that runs in the background. The PC-based application receives offers to install mobile applications and may use the mobile app store or a PC to install the mobile applications to the user's mobile device.

6 Claims, 4 Drawing Sheets

SYSTEM AND METHOD TO INSTALL MOBILE APPLICATIONS FROM A DESKTOP

CROSS-REFERENCE TO RELATED APPLICATION

This application claims priority to U.S. Provisional Patent Application No. 61/816,538, filed Apr. 26, 2013, entitled "SYSTEM AND METHOD TO INSTALL MOBILE APPLICATIONS FROM A DESKTOP," which is incorporated herein by reference in its entirety.

BACKGROUND

Application publishers create relationships with users to inform and educate users about features of desktop and mobile applications. The relationships may take many forms, such as targeted advertising and offers based knowledge of user's behaviors. However, while advertising and offers may successfully engage a user, the user may be engaged while using a platform that is not the intended platform of the application being offered. For example, the user may be using a personal computer, but the offered application is intended for use on a mobile device. As such, the user may pass on an offer, as the application cannot be installed on the mobile device because the user is presently operating his/her personal computer.

SUMMARY

Disclosed herein are systems and methods for Desktop-To-Mobile (D2M) application installation that allows a publisher to extend their relationship with a consumer from the Desktop PC (PC) to a mobile device. In accordance with some implementations, a mobile application store may be used to offer apps on a user's mobile device as a result of a user's advance acceptance of an offer(s) for the apps. The user may install a personal computer (PC)-based application that runs in the background. The PC-based application receives offers to install mobile applications and may use the mobile app store or a PC to install the mobile applications to the user's mobile device.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Overview

In accordance with the present disclosure, there is provided a method and system for Desktop-To-Mobile application installation (Appcaster) that allows a publisher to extend their relationship with a consumer from the Desktop PC to a mobile device. In accordance with some implementations, the Google Play Store may be used to offer apps, either free or paid, on a user's mobile device as part of the service of the present disclosure. Generally, an example process begins with a user being provided with a description of a service, for example a service that will push apps to the user's mobile device from a desktop application. Upon acceptance of the terms of service and the user's consent, a personal computer (PC)-based application ("D2M Client application") is downloaded and installed on the user's personal computer (PC). When executed, the PC application runs in the background and places an icon in, e.g., the system tray, to inform the user that the application is running. In accordance with some aspects, the user provides his/her Google Play login credentials to the PC application, which receives offers to install mobile applications and uses the Google Play store to push the mobile applications to the user's mobile device. If the user wishes to delete the PC application, the user may do so through, e.g., the add/remove software option in the control panel of Windows-based machines. Thus, the present disclosure provides a capability to drive installations of mobile application from a PC on either a one-time or an automated, regular basis (e.g. a mobile application a day). As will be apparent to one of ordinary skill in the art based on the above, any number of mobile applications may be offered to the user in a given period of time. Further, the present disclosure is not limited to mobile applications installed through the Google Play store, and may be applicable to applications installed through other app repositories such as the Apple App Store, Blackberry App World, the Windows Store, an app repository hosted by the D2M 5, and/or any other suitable app store.

Figure 1:
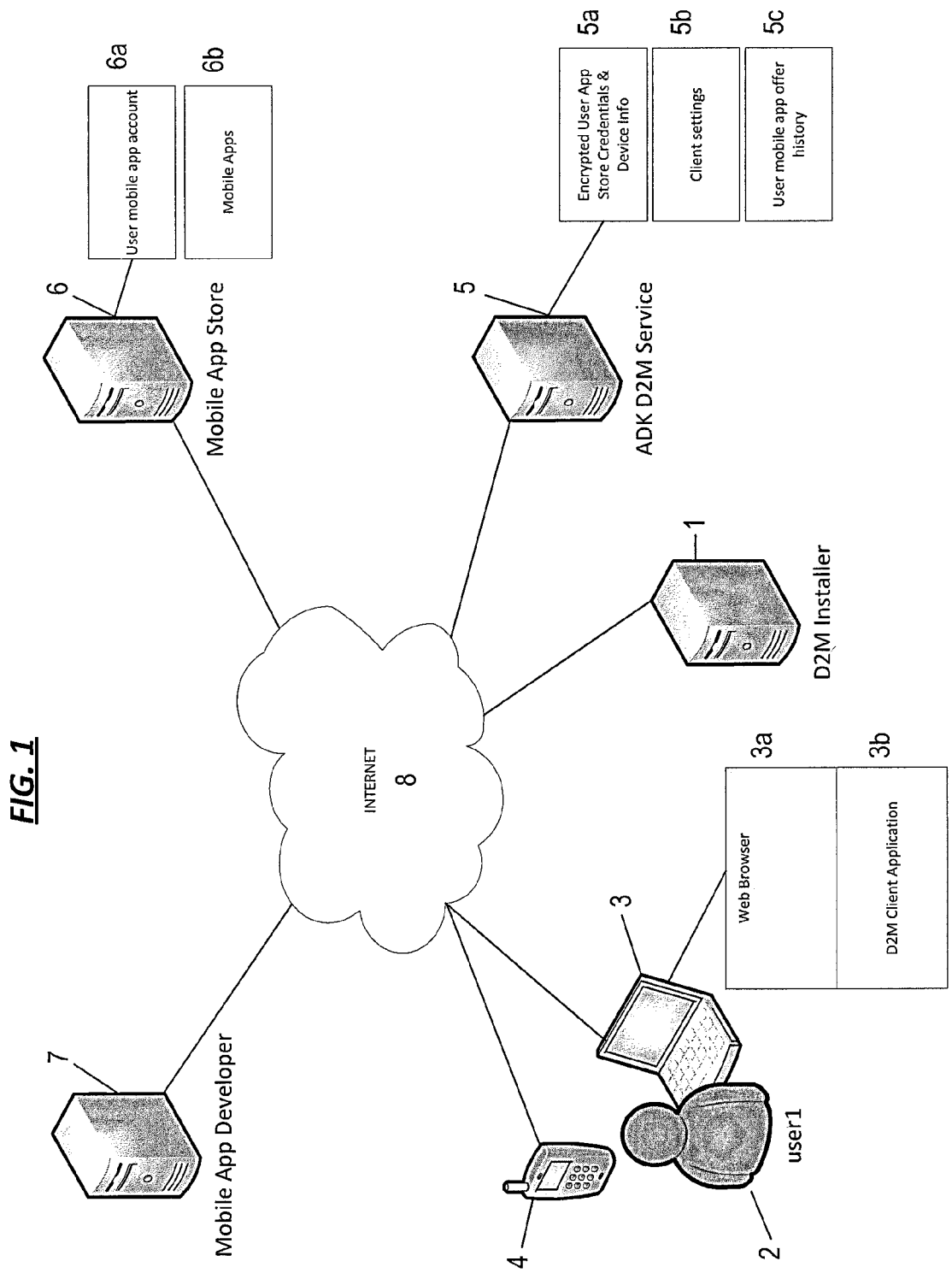
FIG. 1 is a simplified block diagram illustrating an example environment.

Referring to FIG. 1, there is illustrated an example environment in which aspects of the present disclosure may be implemented. A D2M Installer 1 is a server that may be accessed by the user to download the D2M Client application 3b described above. A user 2 is a computer user who has a PC and a mobile device 4 with a unique account with, e.g., a Mobile App Store 6. A user PC 3 is a personal computer that is controlled by the user 2 with, e.g., an internet connection and a web browser 3a. The Web Browser 3a is software for browsing the web, such as Internet Explorer®, Chrome®, or Firefox®. The D2M Client Application 3b is a desktop, PC application that communicates to the Mobile App Store 6 using the user's credentials or other user identifier.

The mobile device 4 may be any mobile device, such as, but not limited to, a cell phone, tablet, or other mobile device capable of running apps from the Mobile App Store 6. A D2M Service 5 is a server that processes requests for offers, user credentials 5a, client application settings 5b, and user mobile app offer history 5c. For example, the D2M Service 5 may be a service by Adknowledge, Inc. of Kansas City, Mo. The user credentials 5a may be stored in an encrypted format, and may include login and device information for the user's account in Mobile App Store 6. The client settings 5b may be operational settings that are passed to D2M Client 3b, including the frequency of offers to mobile device 4. The user Mobile App Offer History 5*c* is a list of apps previously pushed to mobile device 4, including, but not limited to the respective date and time of offer. This information can be used with the Client Settings 5*b* to determine whether the mobile device 4 is available to receive an offer.

The Mobile App Store 6 can be a mobile application discovery and distribution service, such as Google Play. A User Mobile App Account 6*a* is an account in the Mobile App Store 6, associated with the User 2, that is connected to one or more mobile devices. Mobile Apps 6*b* are applications made available by the Mobile App Store 6 by, e.g., Mobile App Developers 7 that may be installed on the mobile device 4. The Mobile App Developer 7 can be a developer or other agent that controls distribution of mobile applications 6*b* through the Mobile App Store 6.

Figure 3:
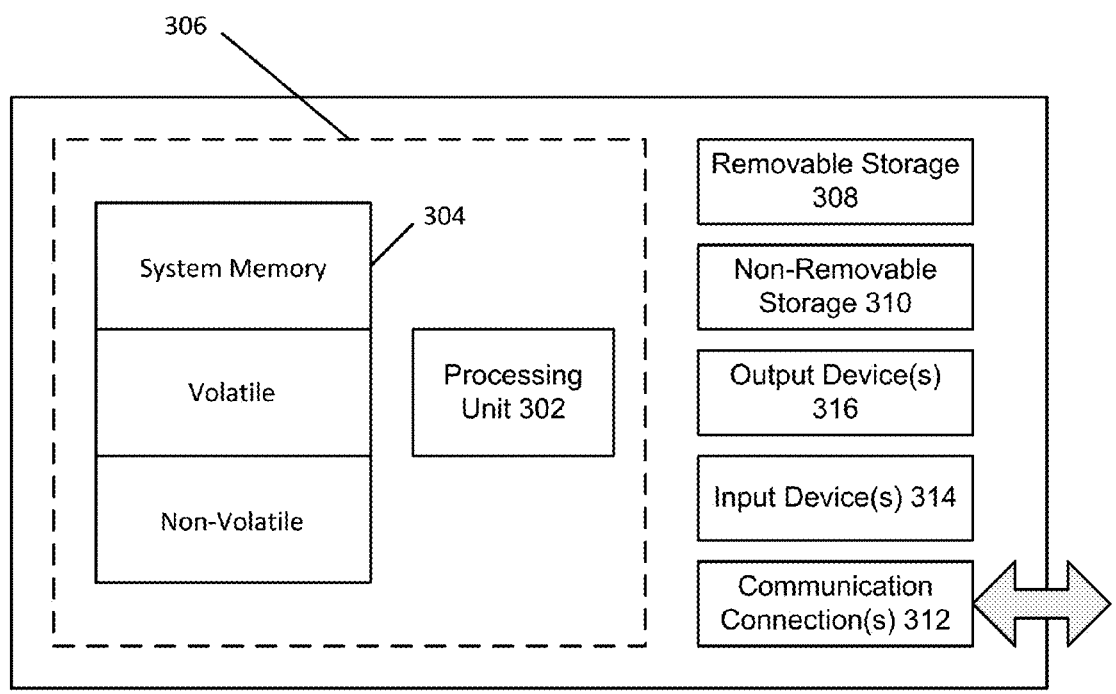
FIG. 3 illustrates an exemplary computing device.

The mobile device 4, User PC 3, D2M Installer 1, and D2M Service 5 may be implemented on a computing device, such as that shown in FIG. 3.

Figure 2A:
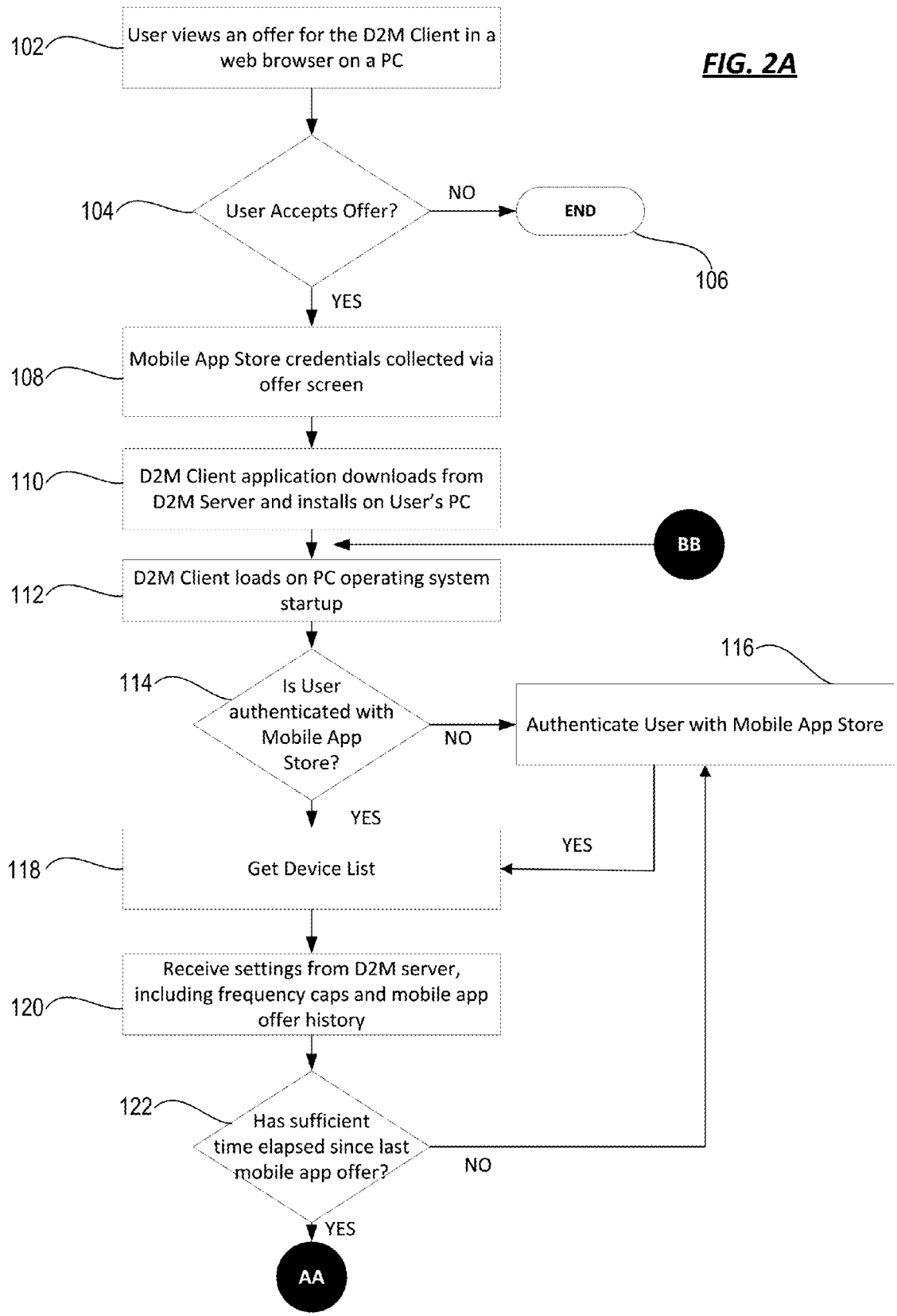
FIGS. 2A-2B illustrate operational flow diagrams of an example process in accordance with the present disclosure.
Figure 2B:
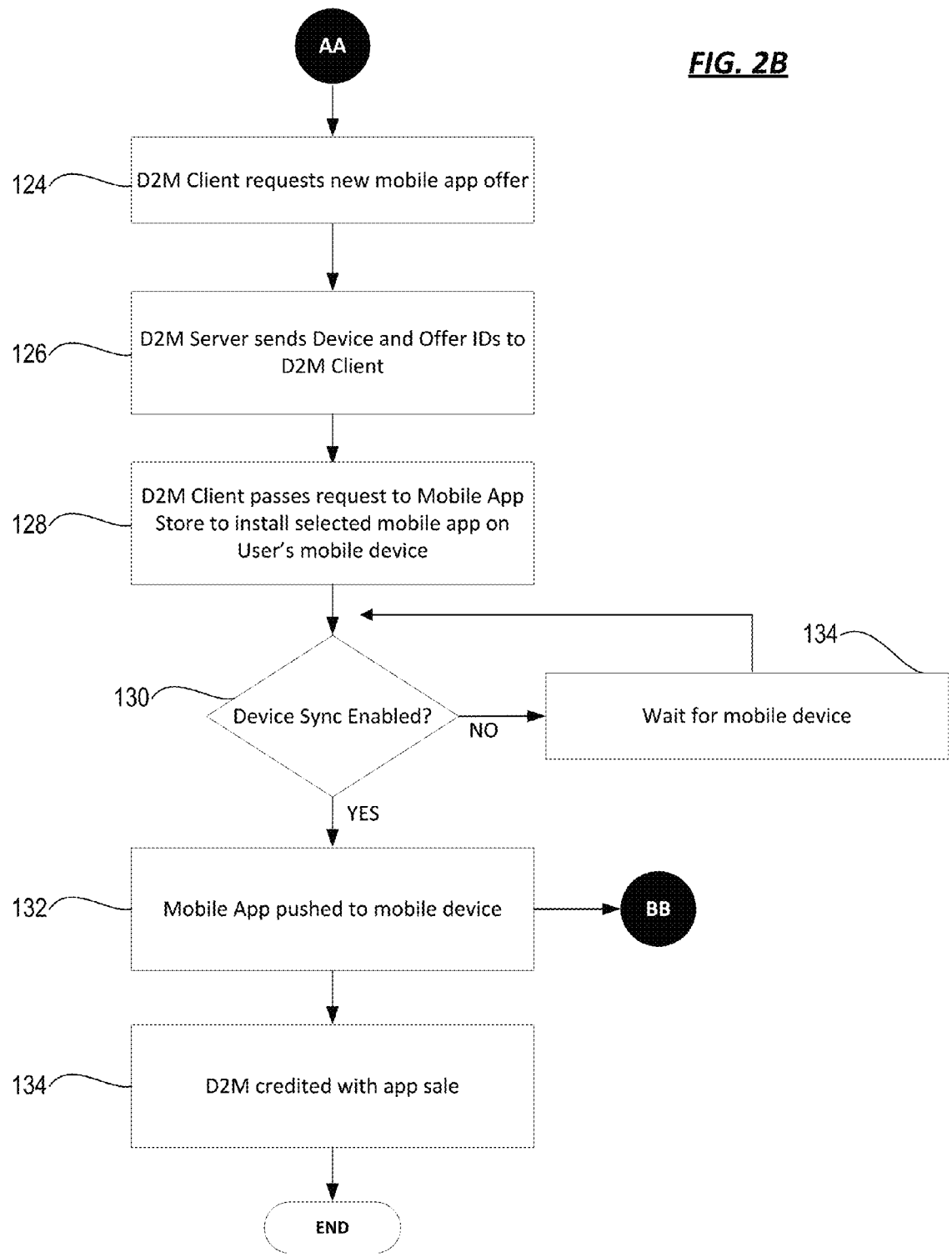

FIGS. 2A-2B illustrate an operational flow of an example process in accordance with the present disclosure. At 102, the User 2 first sees an offer for the D2M application from a service provider like Adknowledge or an Adknowledge Publisher in their Web Browser 3*a*. The offer screen can include a form to collect the login credentials 108 for the User's Mobile App Provider either via user entry or from the Mobile App Store cookie stored on the User PC 3.

At 104, if the User 2 accepts the offer, the D2M Client is downloaded and installed (at 110) from the D2M server 1. Otherwise the process ends at 106. Once installed, at 112, the D2M Client 3*b* will load upon startup. In some implementations, the D2M Client 3*b* does not require an active browser session as long as proper credentials for authentication of User have been collected for the Mobile App Store 6.

At 114, the D2M Client 3*b* checks the authentication state and authenticates with the Mobile App Store 6 (at 116), if necessary. At 118, the D2M Client 3*b* downloads a list of active Device IDs from the Mobile App Store 6. Alternatively, the D2M client 3*b* can collect the list of active Device IDs from the Device 4, e.g. from the Device 4 operatively connected to PC3 for example by a direct cable or a local area network. At 120, the D2M Client 3*b* requests updated settings which can include offer frequency caps and mobile app offer history (e.g., date and time of offer(s)) from the D2M Service 5. At 122, the D2M Client 3*b* compares the date and time of the last offer with the current offer frequency cap. At 124, if the duration since the last offer exceeds the minimum period required by the frequency cap, the D2M Client 3*b* requests a new mobile app offer. If not, the process returns to an authentication check at 116 until sufficient time has elapsed.

At 126, the D2M Service 5 sends Device and Offer IDs that can be interpreted by the Mobile App Store 6 to the D2M Client 3*b*. At 128, the D2M Client 3*b* passes request to the Mobile App Store 6 to have installed the selected mobile app on User's mobile device 4. At 130, the selected mobile application is installed on the mobile device when it is available (at 132) and the D2M Service 5 is credited with the app sale, at 134. The D2M Client then returns to 112 to the startup state. The selected mobile application can be installed, for example by the Mobile App Store 6 or by the PC Client 3*b*.

FIG. 3 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing aspects described herein includes a computing device, such as computing device 300. In its most basic configuration, computing device 300 typically includes at least one processing unit 302 and memory 304. Depending on the exact configuration and type of computing device, memory 304 may be volatile (such as random access memory (RAM)), non-volatile (such as read-only memory (ROM), flash memory, etc.), or some combination of the two. This most basic configuration is illustrated in FIG. 3 by dashed line 306.

Computing device 300 may have additional features/functionality. For example, computing device 300 may include additional storage (removable and/or non-removable) including, but not limited to, magnetic or optical disks or tape. Such additional storage is illustrated in FIG. 3 by removable storage 308 and non-removable storage 310.

Computing device 300 typically includes a variety of computer readable media. Computer readable media can be any available media that can be accessed by device 300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 304, removable storage 308, and non-removable storage 310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of computing device 300.

Computing device 300 may contain communications connection(s) 312 that allow the device to communicate with other devices. Computing device 300 may also have input device(s) 314 such as a keyboard, mouse, pen, voice input device, touch input device, etc. Output device(s) 316 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method implemented by a server, the method comprising:
   providing a client application that is installable on a first computing device associated with a user, wherein the provided client application is configured to automatically:
      determine whether to send an offer request to the server;
      send the offer request to the server;
      receive an offer response from the server; and
      request that a mobile application be installed on a second computing device associated with the user;
   receiving the offer request from the provided client application;
   sending the offer response to the provided client application; and
   providing client application settings to the provided client application, wherein the provided client application is further configured to automatically:
      retrieve the client application settings from the server; and
      determine whether to send the offer request to the server based on the retrieved client application settings;
   wherein the provided client application settings comprise an offer frequency cap and a mobile app offer history; and
   wherein the mobile app offer history comprises a date and a time of a previous offer request and the provided client application determines whether to send the offer request to the server based on the retrieved client application settings by:
      comparing the date and the time of the previous offer request with the offer frequency cap; and
      determining whether a duration since the previous offer request exceeds a predetermined minimum period required by the offer frequency cap.

2. The method of claim 1, wherein the provided client application is further configured to automatically:
   determine whether authentication with a mobile app store is required; and
   authenticate with the mobile app store using credentials associated with the user.

3. The method of claim 1, wherein the install request for the mobile application includes a device ID associated with the second computing device and is interpretable by a mobile app store as identifying the second computing device.

4. A non-transitory computer-readable recording medium having computer-executable instructions stored thereon that, when executed by a server, causes the server to:
   provide a client application that is installable on a first computing device associated with a user, wherein the provided client application is configured to automatically:
      determine whether to send an offer request to the server;
      send the offer request to the server;
      receive an offer response from the server; and
      request that a mobile application be installed on a second computing device associated with the user;
   receive the offer request from the provided client application;
   send the offer response to the provided client application; and
   provide client application settings to the provided client application, wherein the provided client application is further configured to automatically:
      retrieve the client application settings from the server; and
      determine whether to send the offer request to the server based on the retrieved client application settings;
   wherein the provided client application settings comprise an offer frequency cap and a mobile app offer history; and
   wherein the mobile app offer history comprises a date and a time of a previous offer request and the provided client application determines whether to send the offer request to the server based on the retrieved client application settings by:
      comparing the date and the time of the previous offer request with the offer frequency cap; and
      determining whether a duration since the previous offer request exceeds a predetermined minimum period required by the offer frequency cap.

5. The non-transitory computer-readable recording medium of claim 4, wherein the provided client application is further configured to automatically:
   determine whether authentication with a mobile app store is required; and
   authenticate with the mobile app store using credentials associated with the user.

6. The non-transitory computer-readable recording medium of claim 4, wherein the install request for the mobile application includes a device ID associated with the second computing device and is interpretable by a mobile app store as identifying the second computing device.

* * * * *